US 6,595,236 B2

(12) United States Patent
Herlihy

(10) Patent No.: US 6,595,236 B2
(45) Date of Patent: Jul. 22, 2003

(54) VALVE

(76) Inventor: Geoffrey Francis Herlihy, 41 Fifth Street, Bicton (AU), 6157

( * ) Notice: Subject to any disclaimer, the term of this patent is extended or adjusted under 35 U.S.C. 154(b) by 18 days.

(21) Appl. No.: 09/891,047

(22) Filed: Jun. 25, 2001

(65) Prior Publication Data
US 2002/0000248 A1 Jan. 3, 2002

(30) Foreign Application Priority Data

| Jun. 28, 2000 | (AU) | PQ8425 |
| Aug. 22, 2000 | (AU) | PQ9757 |
| Dec. 11, 2000 | (AU) | PR2002 |

(51) Int. Cl.[7] .............................................. F16K 31/34
(52) U.S. Cl. ...................... 137/414; 137/413; 141/198
(58) Field of Search ................................ 137/412, 413, 137/414, 442, 443, 444, 445, 446, 451; 141/198

(56) References Cited

U.S. PATENT DOCUMENTS

| 226,224 | A | * | 4/1880 | Demarest | 137/413 |
| 299,888 | A | * | 6/1884 | White | 137/413 |
| 457,005 | A | * | 8/1891 | McNeil | 137/413 |
| 509,401 | A | * | 11/1893 | Scott | 137/414 |
| 802,330 | A | * | 10/1905 | Schulze | 137/413 |
| 1,302,538 | A | * | 5/1919 | Gulick | 137/413 |
| 1,709,678 | A | * | 4/1929 | Miller | 137/413 |
| 2,328,323 | A | * | 8/1943 | Bowers et al. | 137/414 |
| 2,588,242 | A | * | 3/1952 | Hunter | 137/414 |
| 2,619,122 | A | * | 11/1952 | Hunter | 137/414 |
| 2,698,631 | A | * | 1/1955 | Bashark | 137/414 |
| 2,781,772 | A | * | 2/1957 | Russell | 137/414 |
| 2,842,157 | A | * | 7/1958 | Mosher | 137/413 |
| 5,460,197 | A | * | 10/1995 | Kerger et al. | 137/413 |
| 5,487,404 | A | * | 1/1996 | Kerger | 137/413 |
| 6,322,475 | B2 | * | 11/2001 | Brougham | 137/414 |

FOREIGN PATENT DOCUMENTS

| DE | 1133634 | * | 7/1962 | 137/414 |

* cited by examiner

Primary Examiner—George L. Walton

(57) ABSTRACT

A valve comprising a body having an inlet (13, 113, 213) adapted to be connected to a pressurized source of liquid and an outlet (15, 115, 215) which is to communicate with a reservoir, a valve seat (25, 125, 225) between the inlet and outlet, a valve member (27, 127, 227) movable relative to the valve seat between an open and closed position, the valve member having a first face (29,129, 229) which is movable to be in opposed relation to the valve seat and to be engaged with the valve seat when the valve is in the closed position, the valve member having a second face (31, 131, 231) located in opposed relation to the first face, a chamber (33, 133, 233) located between the body and the second face, a first passageway (35, 135, 235) providing communication between the first face and the chamber, the chamber having a discharge outlet (51, 151, 251), a control means (43, 45, 143, 145, 243, 245) associated with the discharge outlet, the control means being controlled by a bearing member (17, 117, 217) adapted to be associated with a float member (23, 123, 223) to be supported in the liquid in the reservoir, the bearing member being adapted to cause the control means to close the discharge outlet when the bearing member is at a first position corresponding to the surface of the liquid in the reservoir when at an upper level and to open the discharge outlet when the bearing member is at a position corresponding to the surface of the liquid in the reservoir when at a lower level, the second face having a greater area than the area defined on the first face by the valve seat wherein the upper level is spaced from the lower level.

33 Claims, 7 Drawing Sheets

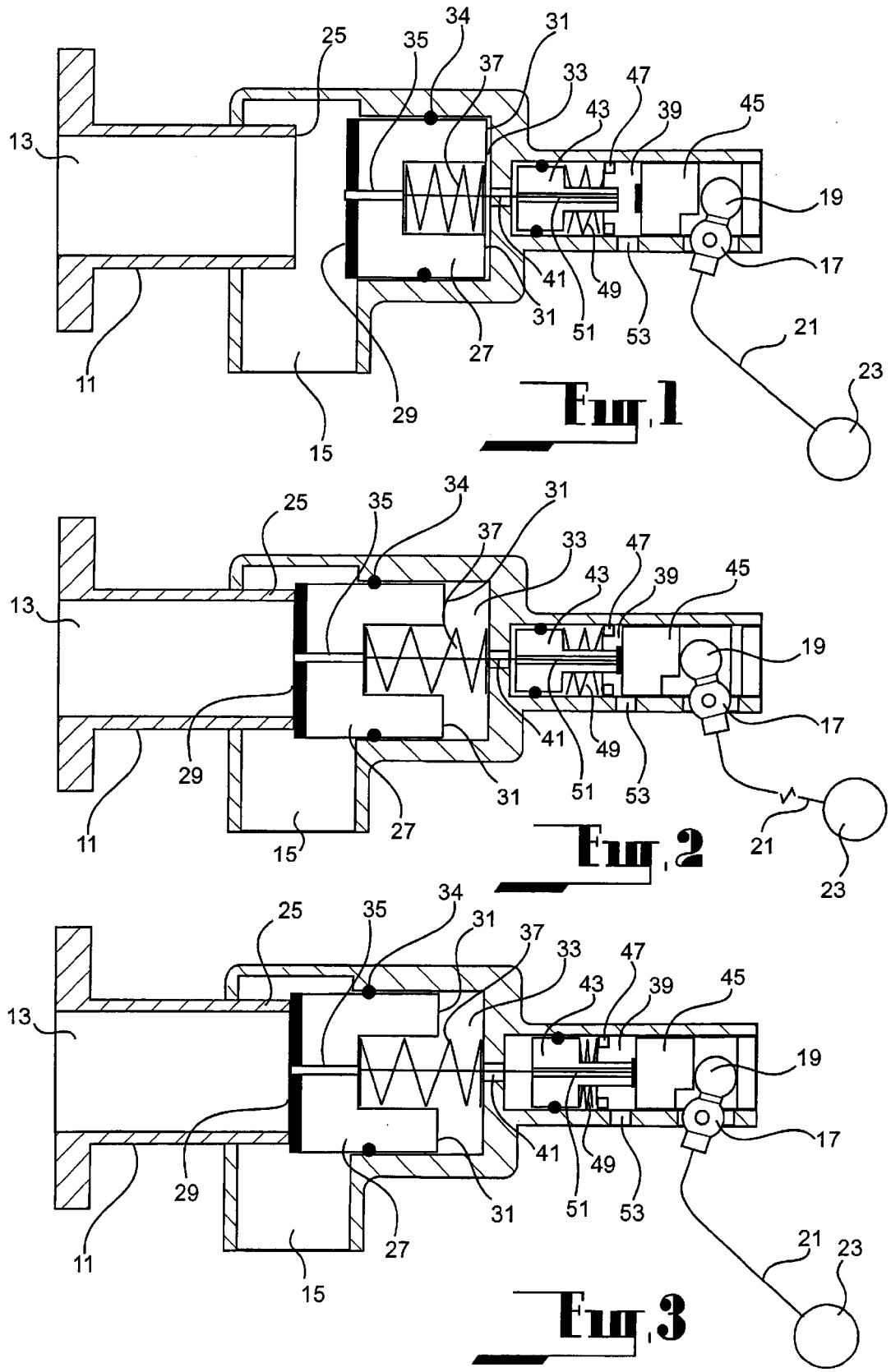

VALVE

FIELD OF THE INVENTION

This invention relates to a valve which is utilised to control the delivery of liquid into a reservoir whereby the volume of liquid in the reservoir is controlled by the valve through the use of a float which is supported on the liquid.

BACKGROUND

It is conventional practice to provide float controlled valves whereby the float is associated with a bearing member which is caused to move as a result of movement of the float resulting from variations in water level and where the bearing member acts upon the valve member to cause it to move into and out of engagement with the valve seat. As a result arrangements must be provided to ensure that the degree of force which can be exerted on the valve seat by the bearing member is sufficient to ensure positive closure of the valve and to maintain the valve in the closed position and in some instances provide a means of supplementing that force to ensure that the valve member remains closed. In addition, in the event of a minor variation in the level of the water being sensed by the float, the valve will be caused to open. Therefore, if there are variations in water level resulting from wave action in the reservoir, this can result in rapid periodic opening and closing of the valve which can be destructive to the delivery line for the reservoir and to the valve. In addition the valve will be caused to open when only a small volume is withdrawn form the reservoir.

It is an object of the present invention to overcome at least some of the previous difficulties of the prior art.

DISCLOSURE OF THE INVENTION

Accordingly, the invention resides in a valve comprising a body having an inlet adapted to be connected to a pressurised source of liquid and an outlet which is to communicate with a reservoir, a valve seat between the inlet and outlet, a valve member movable relative to the valve seat between an open and closed position, said valve member having a first face which is movable to be in opposed relation to the valve seat and to be engaged with the valve seat when the valve is in the closed position, said valve member having a second face located in opposed relation to the first face, a chamber located between the body and the second face, a first passageway providing communication between the first face and the chamber, the said chamber having a discharge outlet, a control means associated with the discharge outlet, said control means being controlled by a bearing member adapted to be associated with a float member to be supported in the liquid in the reservoir, said bearing member being adapted to cause the control means to close the discharge outlet when the bearing member is at a first position corresponding to the surface of the liquid in the reservoir when at an upper level and to open the discharge outlet when the bearing member is at a position corresponding to the surface of the liquid in the reservoir when at a lower level, said second face having a greater area than the area defined on the first face by the valve seat.

According to a preferred feature of the invention, the first passageway is provided through the valve member.

According to a further preferred feature of the invention, the control means includes a closure member slidably supported in the body in opposed relation to the discharge outlet to be movable between a closed position at which it is in sealing engagement with the discharge outlet to close the discharge outlet and an open position at which it is clear of the discharge outlet to open the discharge outlet said bearing member being associated with the closure member to cause movement of the closure member between the closed and open position.

According to a further preferred feature of the invention, the control means includes a shuttle member movably supported in the body to define said chamber, said shuttle member having said discharge outlet, said shuttle member being moveable in the body between two end positions comprising an innermost position and an outermost position, said closure member being engagable with the outer end of the shuttle member and being movable with the shuttle member between its end positions wherein when the shuttle member is in its innermost position, the bearing member is at a position corresponding to the upper level of liquid in the reservoir and when the shuttle member is in its outermost position, the bearing member is in a position corresponding to a liquid level intermediate of the upper and lower level of liquid in the reservoir.

According to a preferred feature of the previous feature the shuttle member is biased to its inner most position.

According to a further preferred feature of the invention, the valve member is biased into the closed position.

According to the a further preferred feature of the invention, the bearing member comprises an arm pivotally supported from the body and having a first end spaced to one side of the pivot which is associated with the control means and a second end to the other side of the pivot which is adapted to be mounted to a float supported on said liquid.

According to a preferred feature of the invention the valve member is slidably and sealingly received in said body. According to one embodiment the space defined between the opposed faces of the valve member and the body which are in a slidable relationship with each other are isolated from the inlet and the chamber. According to a feature of the embodiment the outer edge of the second face supports a seal which is in slidable sealing engagement with the body and a flexible diaphragm is mounted between the body and the valve member intermediate of the first and second face, said diaphragm enabling movement of the valve member between the open and closed position, said space being defined between the seal and the diaphragm.

According to a preferred feature of the invention the valve member is at least partially supported from the body by a diaphragm to isolate the inlet from the chamber and the valve is movable within the body with the flexing of the diaphragm.

According to a preferred feature of the previous feature the shuttle member is biased to its inner most position.

According to a further preferred feature of the invention, the valve member is biased into the closed position.

According to a preferred feature of the invention the shuttle member comprises a member slidably and sealingly supported by the body. According to an embodiment of the invention the discharge outlet comprises a passageway through the shuttle member.

According to a preferred feature of the invention the shuttle member comprises a second diaphragm supported from the body. According to an embodiment of the invention the discharge outlet comprises an opening through the second diaphragm.

The invention will be more fully understood in the light of the following description of several specific embodiments.

BRIEF DESCRIPTION OF THE DRAWINGS

The description is made with the reference to the accompanying drawings of which:

FIG. 1 is a schematic sectional elevation of a valve according to the first embodiment with the valve in the open position;

FIG. 2 is a schematic sectional elevation of a valve according to the first embodiment with the valve in the closed position and where the float member is at its position corresponding to the upper level of the liquid in the reservoir;

FIG. 3 is a schematic sectional elevation of the valve according to the first embodiment with the valve in the closed position and the bearing member at the intermediate position.

DETAILED DESCRIPTION OF SEVERAL SPECIFIC EMBODIMENTS

Figure 4:
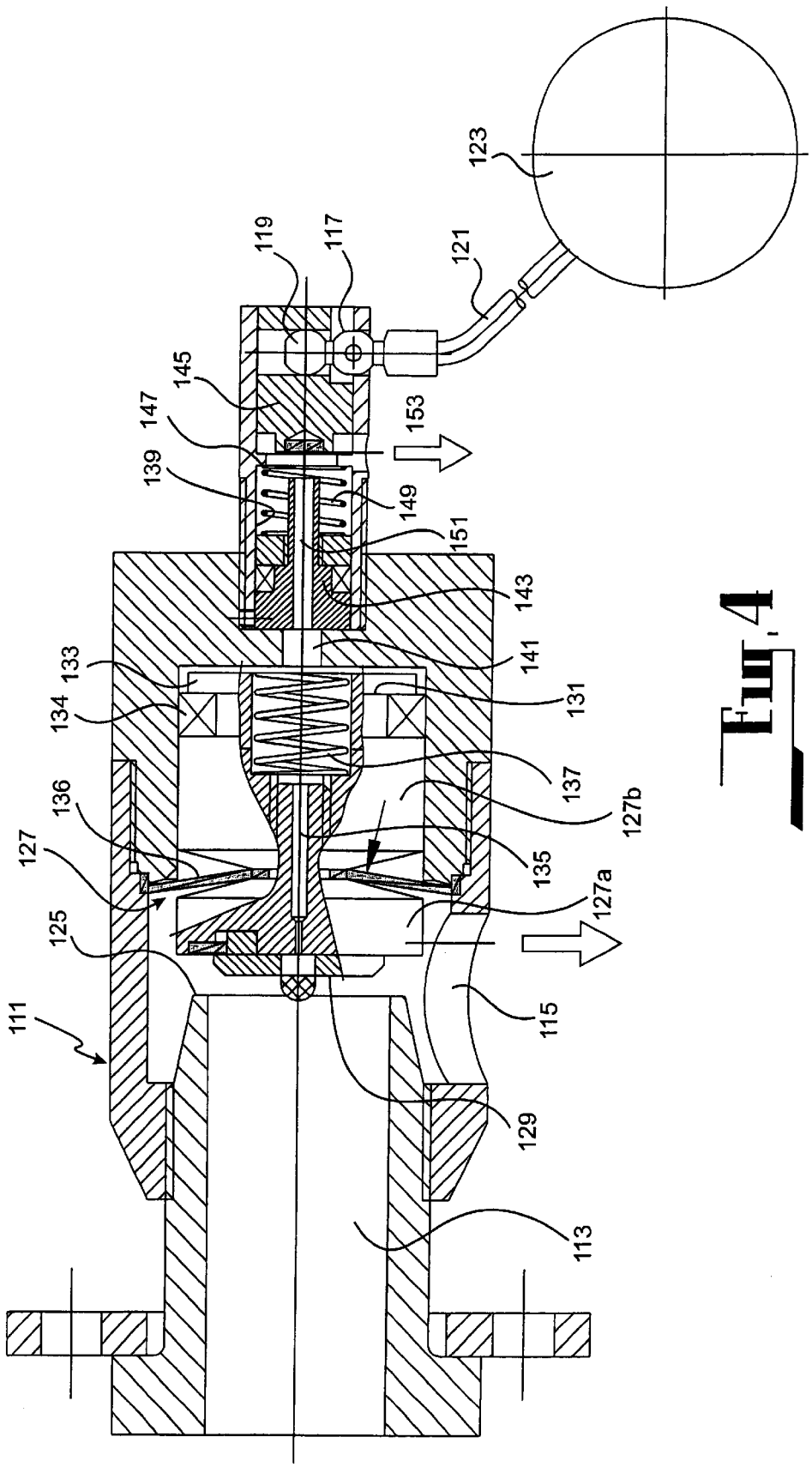
FIG. 4 is a schematic sectional elevation of a valve according to the first second embodiment with the valve in the open position.

The valve according to the first embodiment as shown at FIGS. 1, 2 and 3 comprises a body 11 having an inlet 13 which is adapted to be connected to a source of pressurised liquid and an outlet 15 which is adapted to be connected to a reservoir for delivery of liquid into the reservoir. The valve is associated with a bearing member 17 which is pivotally supported from the body 11 and which has a bearing end 19 which is intended to control the operation of the valve in the manner which will be described below and which is to one side of the pivot. The bearing member has a portion to the other side of the pivot which is adapted to be connected to an arm 21 which supports the float 23 which is to be supported on the surface of the liquid contained in the reservoir.

The inner end of the inlet 13 is provided with a valve seat 25 and the body 11 slidably supports a valve member 27 which is slidable in the body between the closed position (as shown at FIGS. 2 and 3) at which it is in sealing engagement with the valve seat and an open position (as shown at FIG. 1) at which position it is clear of the valve seat 25. The valve member has a first face 29 which is in opposed relation to the valve seat and which is intended to be movable into sealing engagement with the valve seat 25 to effect closure of the valve when the valve member 27 is in its closed position. The valve member has a second face 31 which is opposed relation to the first face 29. A chamber 33 is formed between the body and the second face 31. The chamber is of circular cross section, as is the valve member 27 and the side wall of the valve member 27 supports an O-ring seal 34 which is sealingly and slidingly received within the chamber to isolate the chamber 33 from the inlet 13.

In addition, a biasing spring 37 is provided between the second face 31 of the valve member and the opposed face of the chamber 33 and serves to bias the valve member into its closed position.

A first passageway 35 provides communication between the first face 29 and the second face 31 of the valve member. In addition the area of the second face 31 is greater than the "sealed area" of the first face 29 which is defined by the valve seat when the valve member is in its closed position. As a result if the fluid pressure at the "sealed area" of the first face and the second face is equal a net force is exerted on the valve member when in the closed position to cause it to be moved in the direction of the valve seat.

The valve body 11 is formed with a socket 39 which is in opposed relation to the chamber 33. The outer end of the socket 39 pivotally supports the bearing member 17 and a second passageway 41 is provided in the valve body between the second chamber 33 and the socket 39. The socket 39 also accommodates the control means which comprises a shuttle member 43 and a closure member 45. The shuttle member 43 is slidably and sealingly received within the socket 39 for longitudinal movement along the socket and is movable between two end positions which comprise an innermost position at which the shuttle member 43 is located at the inner most end of the socket 39 (as shown at FIGS. 1 and 2) and an outermost position at which the shuttle member 43 is out of engagement with the innermost end of the socket 39 (as shown at FIG. 3). A second biasing spring 49 located between a stop 47 and the outer end of the shuttle member biases the shuttle member towards its innermost position. The shuttle member 43 is formed with a third passageway 51 which extends between opposed ends of the shuttle member and is provided at its outer end with a discharge outlet. The lower wall of the socket 39 remote from the shuttle member 43 is formed with an opening 53.

The closure member 45 is also slidably received within the socket 39 outward of the shuttle member for movement between a first position at which it is in an abutting relationship with the shuttle and thus is in sealing engagement with the discharge outlet of the shuttle member 43 (as shown at FIGS. 2 and 3) and a disengaged position at which it is spaced from the shuttle member and therefore lies clear of the discharge outlet (as shown at FIG. 1). In addition, the closure member 45 is capable of slidable displacement within the socket 39 as a result of displacement of the shuttle 43 when the closure member 45 is in abutting relationship with the shuttle member 43. The bearing portion 19 of the bearing member 17 bears on the outer end of the closure member 45 to cause movement of the closure member between the engaged position as shown at FIGS. 2 and 3 and the disengaged position as shown at FIG. 1.

In operation when the liquid level in the reservoir is at a lower position in the reservoir causing the valve to be opened, the bearing portion 19 of the bearing member 17 is in a position whereby the closure member 45 is capable of being displaced away from the shuttle member 43 to occupy its disengaged position relative thereto. When at this position, the pressure in the chamber 33 is vented through the third passageway 51 and the valve member 27 is in its open position provided the fluid pressure at the inlet exceeds the biasing force applied by the biasing spring. When at this position, the fluid being delivered from the inlet will be discharged from the inlet through the valve seat 25 to be incident directly upon the valve member 27 to maintain the valve member in the open position. The fluid will then be discharged from the valve through the outlet 15. The cross-sectional area of the first face 29 of the valve member 27 which is in opposed relation to the inlet has an area greater than the area of the valve seat. However, since the substantially only the "sealed area" of the first face 29 will be subjected to the full dynamic pressure of the fluid being delivered into the valve from the inlet 13 the pressure exerted on the outer periphery of the first face will be reduced. In addition as a result of the presence of the first passageway 35, fluid will be delivered into the chamber 33 in a limited manner because of the reduced dimensions of the first passageway 35 and will be capable of being discharged from the chamber 33 through the second passageway 41 in the body and the third passageway 51 in the shuttle 43.

On the liquid rising to its upper level in the reservoir as shown at FIG. 2, the bearing element 19 of the bearing member 17 will be caused to bear upon the closure member 45 to cause it to move into the closed position relative to the shuttle member 43 to close the discharge outlet. As a result of such, the chamber 33 will be pressurised to a pressure corresponding to the head pressure of the fluid being delivered to the first face 29 of the valve member 27. However, in the case of the second face 31, the pressure is active on the full cross-sectional area of the second face. This creates a pressure differential between the first face 29 and second face 31 which will result in the movement of the valve member 27 to its closed position as shown at FIG. 2. This movement is further enhanced by the utilisation of the biasing spring 37. Once the valve member 27 is in its closed position, the "sealed area" of the first face 29 defined by the valve seat 31 is less than the area of the second face and therefore the lack of equilibrium between the forces applied to the valve member 27 will cause it to be maintained in the closed position, as shown at FIG. 2.

Once the valve member 27 has moved into its closed position, the pressure in the chamber 33 will increase to the inlet pressure of the valve, such increase in pressure will cause longitudinal displacement of the shuttle member 43 within the socket 39 to its outermost position. This longitudinal movement of the shuttle member causes corresponding movement of the closure member 45 within the socket 39 and corresponding movement of the bearing element 19 of the bearing member 17 to cause the float 23 to be forced into an immersed position within the body of water as shown at FIG. 3. As a result, on the level of water in the reservoir falling from the upper most level as shown at FIG. 2, the float member will not be caused to move until the level of liquid has moved to a position below the position at which the liquid would support the float when at its intermediate position as shown at FIG. 3. Therefore, the liquid level is capable of some variation below the upper level of FIG. 2 without causing movement of the float member 23 sufficient to cause opening of the valve. In order for the valve to open, the float must be moved to a position below that of the intermediate position shown at FIG. 3.

Figure 5:
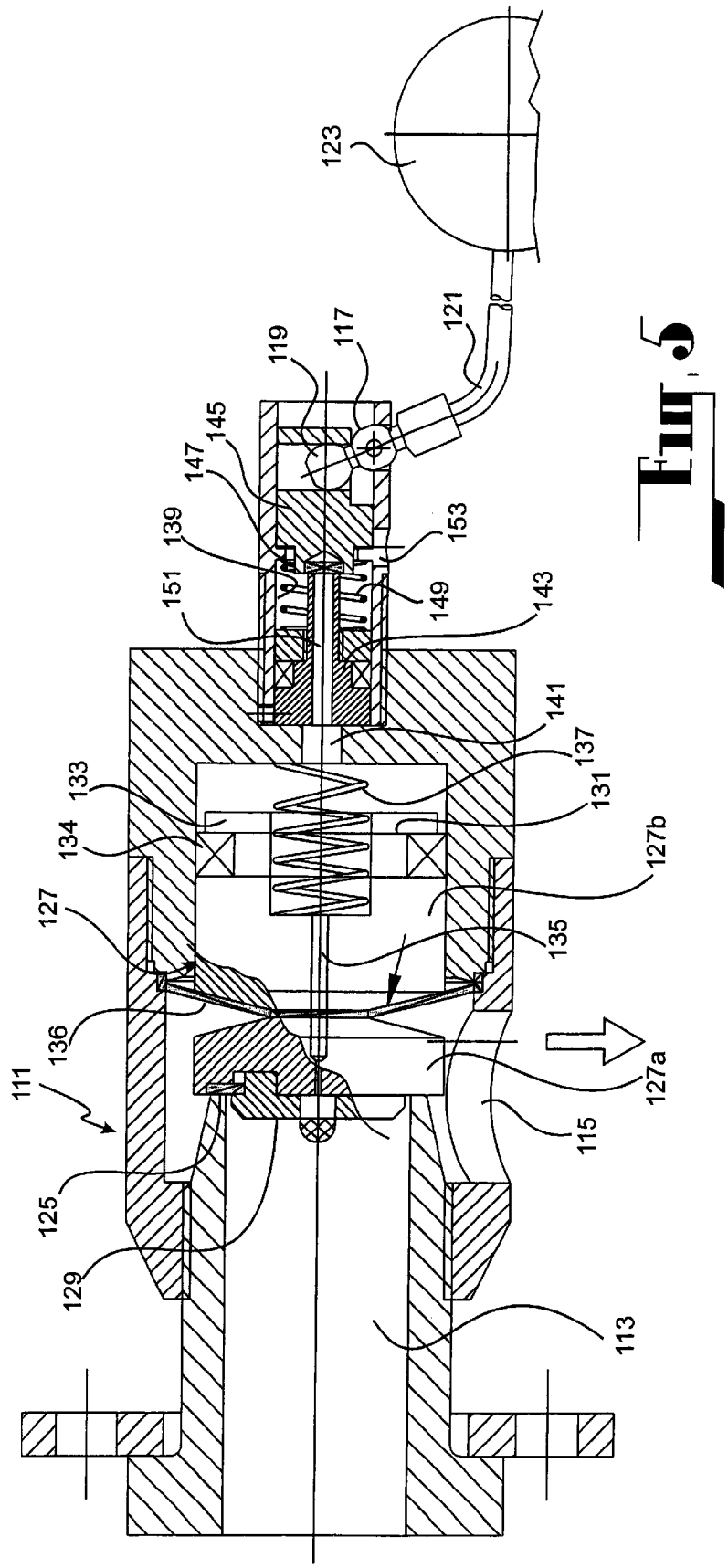
FIG. 5 is a schematic sectional elevation of a valve according to the first second embodiment with the valve in the closed position and where the float member is at its position corresponding to the upper level of the liquid in the reservoir.
Figure 6:
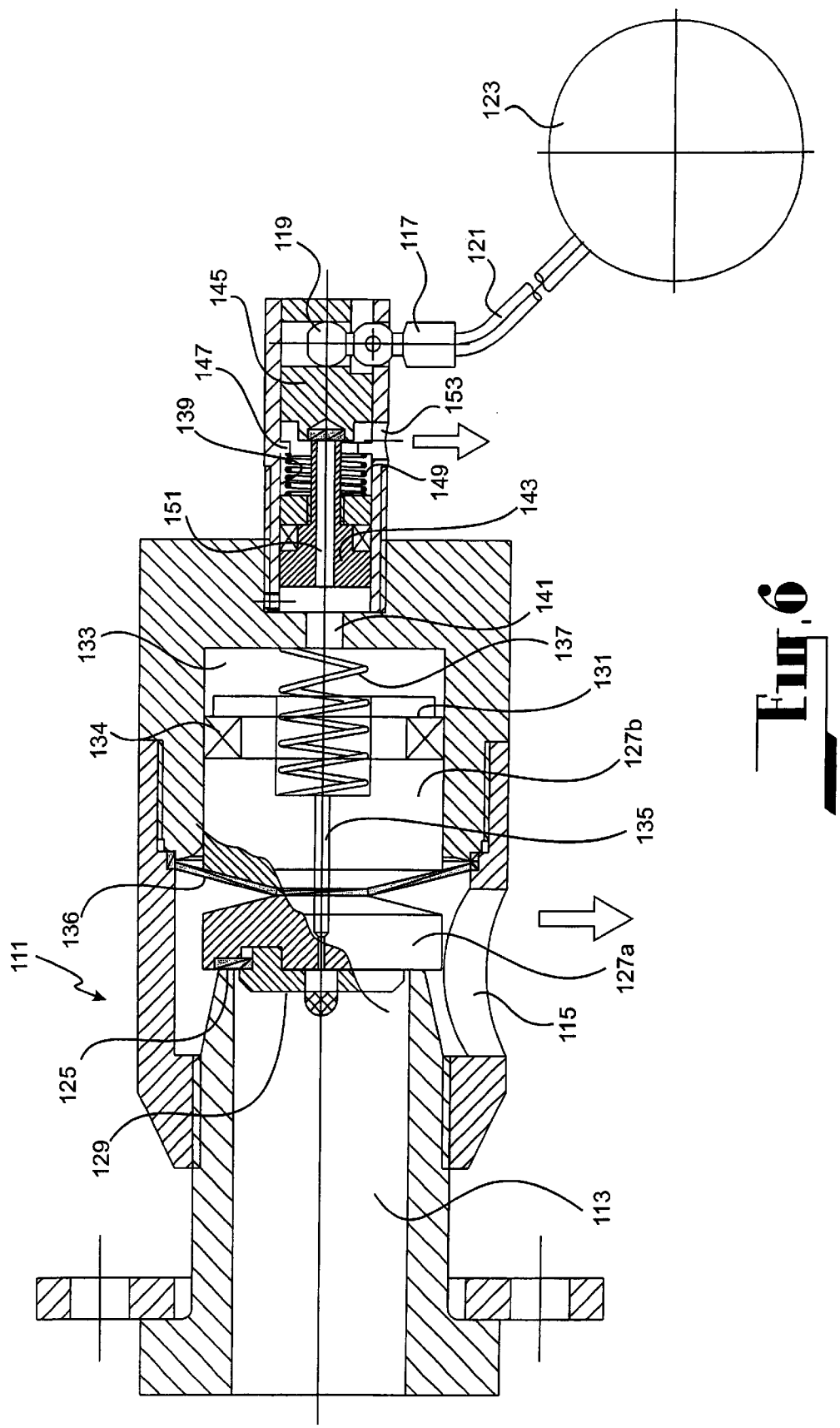
FIG. 6 is a schematic sectional elevation of the valve according to the first second embodiment with the valve in the closed position and the bearing member at the intermediate position.

The valve according to the second embodiment as shown at FIGS. 4, 5 and 6 comprises a body 111 having an inlet 113 which is adapted to be connected to a source of pressurised liquid and an outlet 115 which is adapted to be connected to a reservoir for delivery of liquid into the reservoir. The valve is associated with a bearing member 117 which is pivotally supported from the body 111 and which has a bearing end 119 which is intended to control the operation of the valve in the manner which will be described below and which is to one side of the pivot. The bearing member has a portion to the other side of the pivot which is adapted to be connected to arm 121 which supports the float 123 which is to be supported on the surface of the liquid contained in the reservoir.

The inner end of the inlet 113 is provided with a valve seat 125 and the body 111 slidably supports a valve member 127 which is slidable in the body between the closed position (as shown at FIGS. 5 and 6) at which it is in sealing engagement with the valve seat and an open position (as shown at FIG. 4) at which position it is clear of the valve seat 125. The valve member has a first face 129 which is in opposed relation to the valve seat and which is intended to be movable into sealing engagement with the valve seat 125 to effect closure of the valve when the valve member 127 is in its closed position. The valve member has a second face 131 which is opposed relation to the first face 129. A chamber 133 is formed between the body and the second face 131.

The chamber 133 is of circular cross section, as is the valve member 127. The side wall of the valve member 127 adjacent the second face 131 supports an O-ring seal 134 which is sealingly and slidingly received within the chamber. In addition the valve member 127 is formed of two portions 127a and 127b which are threadably interconnected. The portions clampingly engage the inner perimeter of an annular diaphragm 136 where the outer perimeter of the annular diaphragm 136 is sealingly engaged with the body 111. The diaphragm 136 and the O-ring seal 134 serve to isolate the space defined between the outer radial face of the valve member 134 and the inner radial face of the chamber 133 from the inlet side of the valve member and the inner end of the chamber. As a result the diaphragm 136 and the O-ring seal 134 prevent the entry of solid debris and the like, which may be entrained in the fluid flowing into the inlet 113, from entering the space defined between the outer radial face of the valve member 134 and the inner radial face of the chamber 133 and inhibiting the sealing and/or sliding relationship between the valve member 127 and the chamber 133.

In addition, a biasing spring 137 is provided between the second face 131 of the valve member and the opposed face of the chamber 133 and serves to bias the valve member into its closed position.

A first passageway 135 provides communication between the first face 129 and the second face 131 of the valve member. In addition the area of the second face 131 is greater than the "sealed area" of the first face 129 which is defined by the valve seat when the valve member is in its closed position. As a result if the fluid pressure at the "sealed area" of the first face and the second face is equal a net force is exerted on the valve member when in the closed position to cause it to be moved in the direction of the valve seat The valve body 111 is formed with a socket 139 which is in opposed relation to the chamber 133. The outer end of the socket 139 pivotally supports the bearing member 117 and a second passageway 141 is provided in the valve body between the second chamber 133 and the socket 139. The socket 139 also accommodates the control means which comprises a shuttle member 143 and a closure member 145. The shuttle member 143 is slidably and sealingly received within the socket 139 for longitudinal movement along the socket and is movable between two end positions which comprise an innermost position at which the shuttle member 143 is located at the inner most end of the socket 139 (as shown at FIGS. 4 and 5) and an outermost position at which the shuttle member 143 is out of engagement with the inner end of the socket 139 (as shown at FIG. 6). A second biasing spring 149 located between a stop 147 and the outer end of the shuttle member biases the shuttle member towards its innermost position. The shuttle member 143 is formed with a third passageway 151 which extends between opposed ends of the shuttle member and is provided at its outer end with a discharge outlet. The lower wall of the socket 139 remote from the shuttle member 143 is formed with an opening 153.

The closure member 145 is also slidably received within the socket 139 outward of the shuttle member for movement between a first position at which it is in an abutting relationship with the shuttle and thus is in sealing engagement with the discharge outlet of the shuttle member 143 (as shown at FIGS. 5 and 6) and a disengaged position at which it is spaced from the shuttle member and therefore lies clear of the discharge outlet (as shown at FIG. 4). In addition, the closure member 145 is capable of slidable displacement within the socket 139 as a result of displacement of the shuttle 143 when the closure member 145 is in abutting relationship with the shuttle member 143. The bearing portion 119 of the bearing member 117 bears on the outer end of the closure member 145 to cause movement of the closure member between the engaged position as shown at FIGS. 5 and 6 and the disengaged position as shown at FIG. 4.

In operation when the liquid level in the reservoir is at a lower position in the reservoir causing the valve to be opened, the bearing portion 119 of the bearing member 117 is in a position whereby the closure member 145 is capable of being displaced away from the shuttle member 143 to occupy its disengaged position relative thereto. When at this position, the pressure in the chamber 133 is vented through the third passageway 149 and the valve member 127 is in its open position provided the fluid pressure at the inlet exceeds the biasing force applied by the biasing spring. When at this position, the fluid being delivered from the inlet will be discharged from the inlet through the valve seat 125 to be incident directly upon the valve member 127 to maintain the valve member in the open position. The fluid will then be discharged from the valve through the outlet 115. The area of the first face 129 of the valve member 127 which is in opposed relation to the inlet has an area greater than the area of the valve seat. However, since the substantially only the "sealed area" of the first face 129 will be subjected to the full dynamic pressure of the fluid being delivered into the valve from the inlet 113 the pressure exerted on the outer periphery of the first face will be reduced. In addition as a result of the presence of the first passageway 135, fluid will be delivered into the chamber 133 in a limited manner because of the reduced dimensions of the first passageway 135 and will be capable of being discharged from the chamber 133 through the second passageway 41 in the body and the third passageway 149 in the shuttle 143.

On the liquid rising to its upper level in the reservoir as shown at FIG. 5, the bearing element 119 of the bearing member 117 will be caused to bear upon the closure member 145 to cause it to move into the closed position relative to the shuttle member 143 to close the discharge outlet. As a result of such, the chamber 133 will be pressurised to a pressure corresponding to the head pressure of the fluid being delivered to the first face 129 of the valve member 127. However, in the case of the second face 131, the pressure is active on the full cross-sectional area of the second face. This creates a pressure differential between the first face 129 and second face 131 which will result in the movement of the valve member 127 to its closed position as shown at FIG. 5. This movement is further enhanced by the utilisation of the biasing spring 137. Once the valve member 127 is in its closed position, the "sealed area" of the first face 129 defined by the valve seat 131 is less than the area of the second face and therefore the lack of equilibrium between the forces applied to the valve member 127 will cause it to be maintained in the closed position, as shown at FIG. 5.

Once the valve member 127 has moved into its closed position, the pressure in the chamber 133 will increase to the inlet pressure of the valve, such increase in pressure will cause longitudinal displacement of the shuttle member 143 within the socket 139 to its outermost position. This longitudinal movement of the shuttle member causes corresponding movement of the closure member 145 within the socket 139 and corresponding movement of the bearing element 119 of the bearing member 117 to cause the float 123 to be forced into an immersed position within the body of water as shown at FIG. 6. As a result, on the level of water in the reservoir falling from the upper most level as shown at FIG. 5, the float member will not be caused to move until the level of liquid has moved to a position below the position at which the liquid would support the float when at its intermediate position as shown at FIG. 6. Therefore, the liquid level is capable of some variation below the upper level of FIG. 5 without causing movement of the float member 123 sufficient to cause opening of the valve. In order for the valve to open, the float must be moved to a position below that of the intermediate position shown at FIG. 6.

Figure 7:
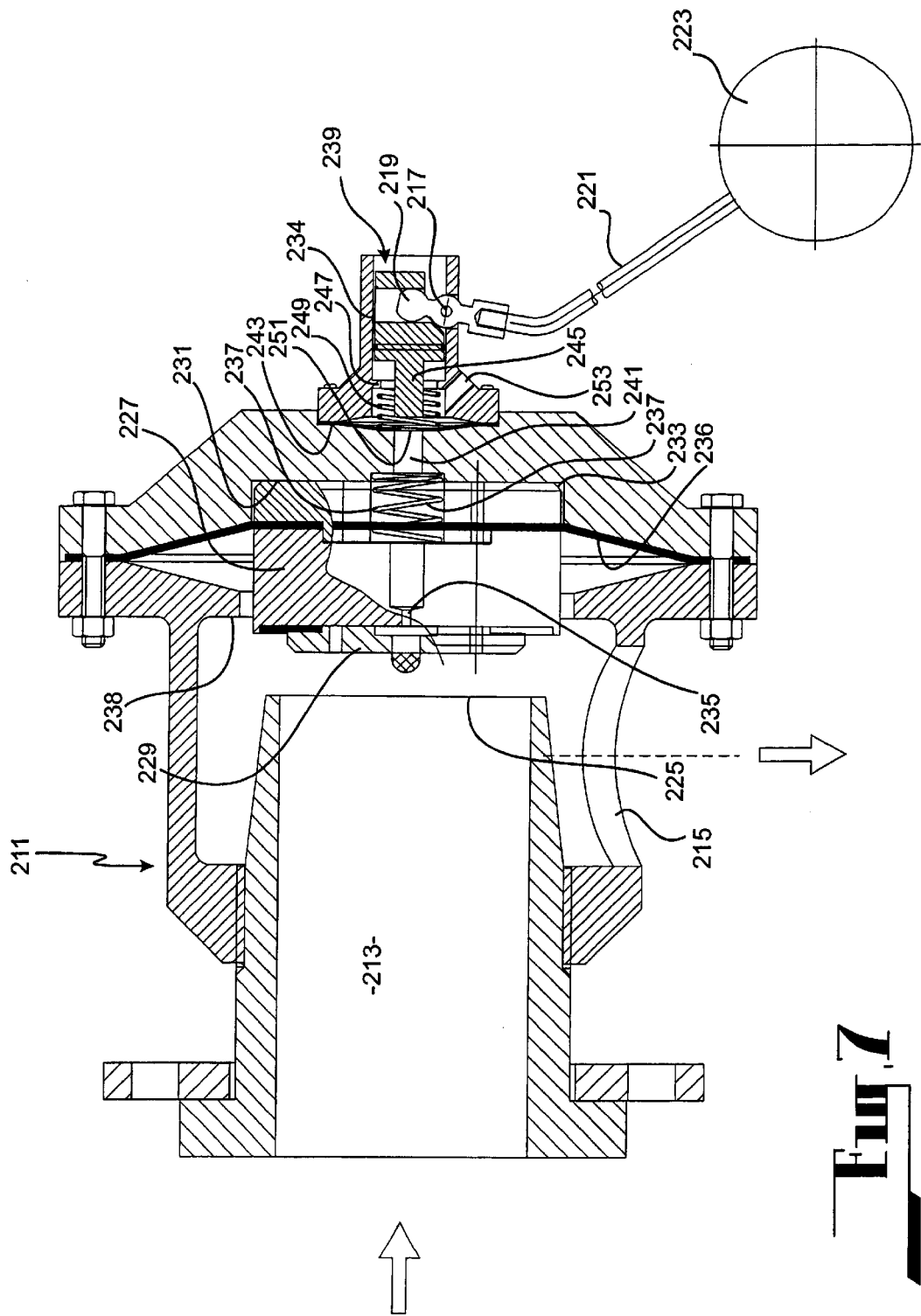
FIG. 7 is a schematic sectional elevation of a valve according to the third embodiment when the valve is in the open position.
Figure 8:
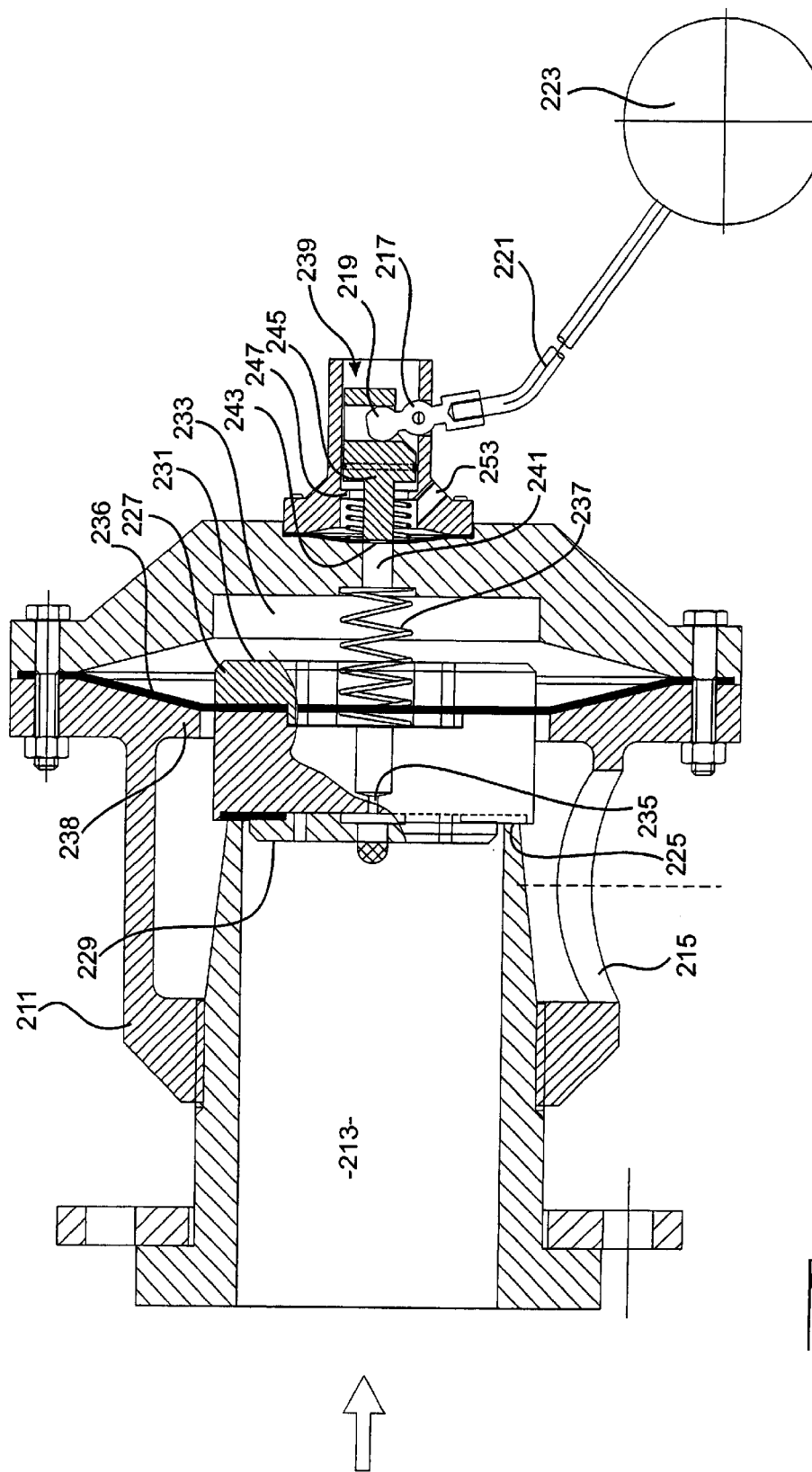
FIG. 8 is a schematic sectional elevation of a valve according to the third embodiment with the valve in the closed position and where the float member is at its position corresponding to the upper level of the liquid in the reservoir.
Figure 9:
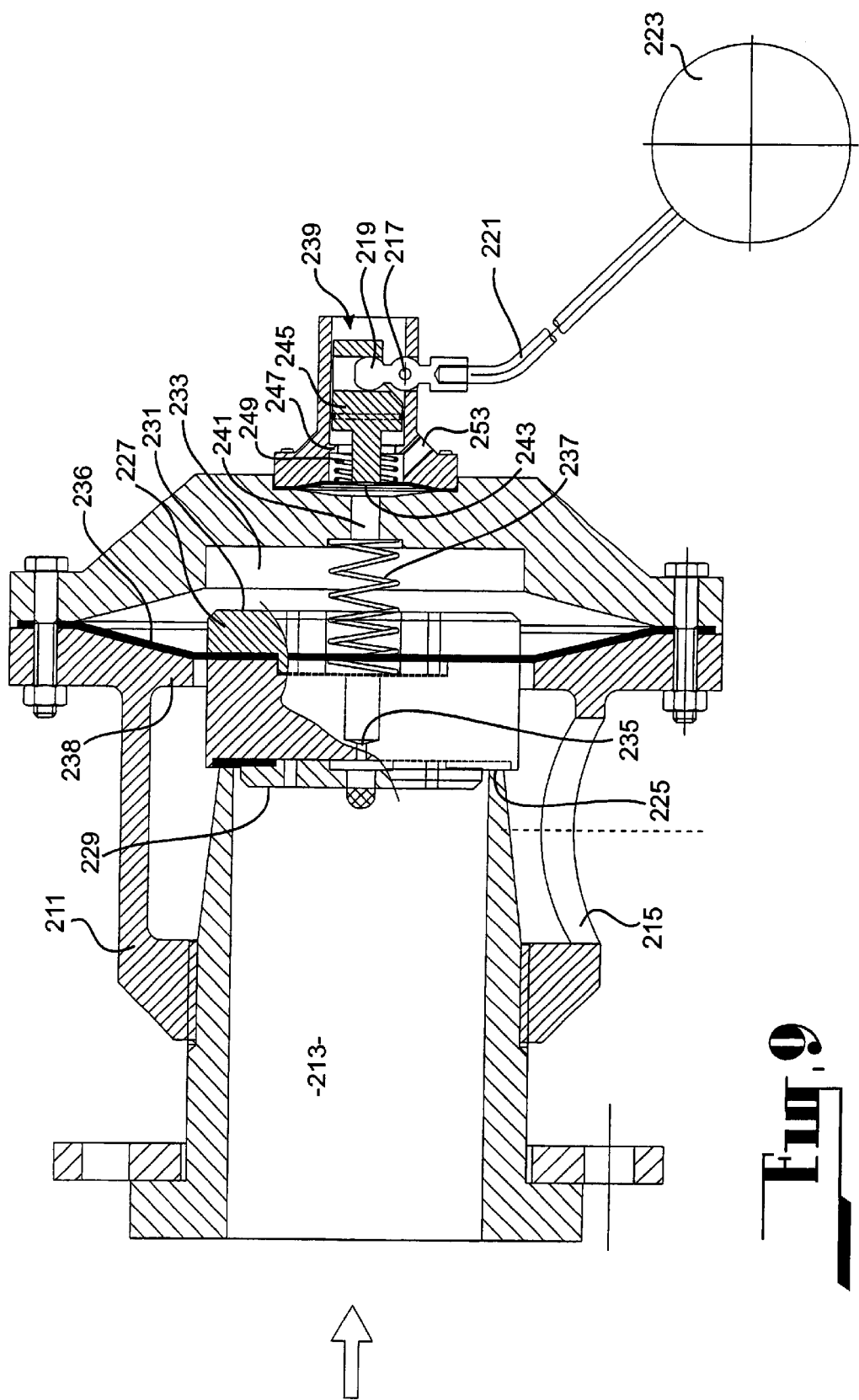
FIG. 9 is a schematic sectional elevation of the valve according to the third embodiment with the valve in the closed position and the bearing member at said intermediate position.

The valve according to the third embodiment as shown at FIGS. 7, 8 and 9 comprises a body 211 having an inlet 213 which is adapted to be connected to a source of pressurised liquid and an outlet 215 which is adapted to be connected to a reservoir for delivery of liquid into the reservoir. The valve is associated with a bearing member 217 which is pivotally supported from the body 211 and which has a bearing end 219 which is intended to control the operation of the valve in the manner which will be described below and which is to one side of the pivot. The bearing member has a portion to the other side of the pivot which is adapted to be connected to arm 221 which supports the float 223 which is to be supported on the surface of the liquid contained in the reservoir.

The inner end of the inlet 213 is provided with a valve seat 225 and the body 211 supports a valve member 227 which is movable in the body between the closed position (as shown at FIGS. 8 and 9) at which it is in sealing engagement with the valve seat 225 and an open position (as shown at FIG. 7) at which position it is clear of the valve seat 225. The valve member has a first face 229 which is intended to be in sealing engagement with the valve seat 225 to effect closure of the valve when the valve member 227 is in its closed position. The valve member has a second face 231 which is opposed relation to the first face 129. The valve member 227 is movably supported in the body by an annular diaphragm 236 which is flexible to enable the valve member 227 to move between the closed and open position. The internal face of the body is formed with an annular guide web 238 which has an inner bore with a profile which is complementary to the cross sectional profile of the valve member 227 but which has a diameter such that it does not sealingly engage the side wall of the valve member 227. As a result there is no sliding or sealing engagement between the valve member 227 and the body.

A chamber 233 is formed between the body and the surface defined by second face 231 of the valve member 227 and inner face of the diaphragm 236.

The diaphragm 236 and the valve member 227 serve to isolate the inlet 213 from the chamber 233 whilst the web 238 serves to isolate the external face of the diaphragm from the dynamic pressure of the fluid flowing through the inlet when the valve member 227 is in the open position. As a result the presence of solid debris and the like, which may be entrained in the fluid flowing through the valve cannot inhibit the movement of the valve member 227 between the open and closed positions.

In addition, a biasing spring 237 is provided between the second face 131 of the valve member and the opposed face of the chamber 233 and serves to bias the valve member into its closed position.

A first passageway 235 provides communication between the first face 229 and the second face 231 of the valve member. In addition the area of the second face 231 is greater than the "sealed area" of the first face 229 which is defined by the valve seat when the valve member is in its closed position. As a result if the fluid pressure at the "sealed area" of the first face and the second face is equal a net force is exerted on the valve member when in the closed position to cause it to be moved in the direction of the valve seat.

The valve body 211 is formed with a socket 239 which is in opposed relation to the chamber 233. The outer end of the socket 239 pivotally supports the bearing member 217 and a second passageway 241 is provided in the valve body between the second chamber 233 and the socket 239. The socket 239 also accommodates the control means which comprises a second diaphragm 243 and a closure member 245. The second diaphragm 243 is supported across the outer end of the second passageway and is capable of movement between two end positions which comprise an innermost position at which the second diaphragm 243 is located over the outer end of the second passageway 241 (as shown at FIGS. 7 and 8) and an outermost position at which the second diaphragm 243 is spaced away from the outer end of the passageway (as shown at FIG. 9). The body 211 is configured to permit the flexing of the second diaphragm 243 to permit its movement between the two end positions. A second biasing spring 249 located between a stop 147 and the the second diaphragm biases the second diaphragm towards its innermost position. The second diaphragm 243 is formed with a third passageway 251 in the form of a central opening which extends between opposed faces of the second diaphragm and is provided at its outer end with a discharge outlet. The lower wall of the socket 239 remote from the second diaphragm 243 is formed with an opening 253.

The closure member 245 is also slidably received within the socket 239 outward of the second diaphragm 243 for movement between a first position at which it is in an abutting relationship with the second diaphragm 243 and thus is in sealing engagement with the discharge outlet of the second diaphragm 243 (as shown at FIGS. 8 and 9) and a disengaged position at which it is spaced from the second diaphragm and therefore lies clear of the discharge outlet (as shown at FIG. 7). In addition, the closure member 245 is capable of slidable displacement within the socket 239 as a result of displacement of the second diaphragm 243 when the closure member 245 is in abutting relationship with the second diaphragm 243. The bearing portion 219 of the bearing member 217 bears on the outer end of the closure member 245 to cause movement of the closure member between the engaged position as shown at FIGS. 8 and 9 and the disengaged position as shown at FIG. 7.

In operation when the liquid level in the reservoir is at a lower position in the reservoir causing the valve to be opened, the bearing portion 219 of the bearing member 217 is in a position whereby the closure member 245 is capable of being displaced away from the second diaphragm 243 to occupy its disengaged position relative thereto. When at this position, the pressure in the chamber 233 is vented through the third passageway 249 and the valve member 227 is in its open position provided the fluid pressure at the inlet exceeds the biasing force applied by the biasing spring. When at this position, the fluid being delivered from the inlet will be discharged from the inlet through the valve seat 225 to be incident directly upon the valve member 227 to maintain the valve member in the open position. The fluid will then be discharged from the valve through the outlet 215. The area of the first face 229 of the valve member 227 which is in opposed relation to the inlet has an area greater than the area of the valve seat. However, since the substantially only the "sealed area" of the first face 229 will be subjected to the full dynamic pressure of the fluid being delivered into the valve from the inlet 213 the pressure exerted on the outer periphery of the first face will be reduced. In addition as a result of the presence of the first passageway 235, fluid will be delivered into the chamber 233 in a limited manner because of the reduced dimensions of the first passageway 235 and will be capable of being discharged from the chamber 233 through the second passageway 41 in the body and the third passageway 249 in the second diaphragm 243.

On the liquid rising to its upper level in the reservoir as shown at FIG. 8, the bearing element 219 of the bearing member 217 will be caused to bear upon the closure member 245 to cause it to move into the closed position relative to the second diaphragm 243 to close the discharge outlet. As a result of such, the chamber 233 will be pressurised to a pressure corresponding to the head pressure of the fluid being delivered to the first face 229 of the valve member 227. However, in the case of the second face 231, the pressure is active on the full cross-sectional area of the second face. This creates a pressure differential between the first face 229 and second face 231 which will result in the movement of the valve member 227 to its closed position as shown at FIG. 8. This movement is further enhanced by the biasing spring 237. Once the valve member 227 is in its closed position, the "sealed area" of the first face 229 defined by the valve seat 231 is less than the area of the second face and therefore the lack of equilibrium between the forces applied to the valve member 227 will cause it to be maintained in the closed position, as shown at FIG. 8.

Once the valve member 227 has moved into its closed position, the pressure in the chamber 233 will increase to the inlet pressure of the valve, such increase in pressure will cause I displacement of the second diaphragm 243 within the socket 239 to its outermost position. This movement of the second diaphragm 243 causes corresponding movement of the closure member 245 within the socket 239 and corresponding movement of the bearing element 219 of the bearing member 217 to cause the float 223 to be forced into an immersed position within the body of water as shown at FIG. 9. As a result, on the level of water in the reservoir falling from the upper most level as shown at FIG. 8, the float member will not be caused to move until the level of liquid has moved to a position below the position at which the liquid would support the float when at its intermediate position as shown at FIG. 9. Therefore, the liquid level is capable of some variation below the upper level of FIG. 8 without causing movement of the float member 223 sufficient to cause opening of the valve. In order for the valve to open, the float must be moved to a position below that of the intermediate position shown at FIG. 9.

Each of the embodiments provide a valve whereby the action of closing the valve member by virtue of the bearing member is indirect. Furthermore, the valve provides a means whereby there can be some variation in the liquid level below the upper most level of the liquid in the reservoir without resulting in opening of the valve. Therefore, the valve is able to accommodate for variations in liquid level that may rise from minimal volume consumptions and/or from wave action on the surface of the reservoir.

Throughout the specification, unless the context requires otherwise, the word "comprise" or variations such as "comprises" or "comprising", will be understood to imply the inclusion of a stated integer or group of integers but not the exclusion of any other integer or group of integers.

It should be appreciated that the scope of the present invention need not be limited to the particular scope of the embodiment described above.

The claims defining the invention are as follows:

1. A valve comprising a body having an inlet adapted to be connected to a pressurised source of liquid and an outlet which is to communicate with a reservoir, a valve seat between the inlet and outlet, a valve member movable relative to the valve seat between an open and closed position, said valve member having a first face which is movable to be spaced from the valve seat and to be engaged with the valve seat when the valve is in the closed position, said valve member having a second face located in opposed relation to the first face, said second face having a greater area than the area defined on the first face by the valve seat, a chamber located between the body and the second face, a first passageway providing communication between the first face and the chamber, a shuttle member defining a portion of the wall of the chamber and movably supported in the body to be movable between two end positions comprising an innermost position and an outermost position in response to the pressure in the chamber, a closure member supported in the body, the closure member being movable between a closed position at which it is in sealing engagement with the discharge outlet and an open position at which it is clear of the discharge outlet, a bearing member supported from the body and adapted to be associated with a float member to be supported in the liquid in the reservoir, said bearing member being adapted to cause the movement of the closure member to close the discharge outlet when the bearing member is at a first position related to the level of the surface of the liquid in the reservoir when at an upper level and to open the discharge outlet when the bearing member is at a position related to the level of the surface of the liquid in the reservoir when at a lower level, wherein the upper level is spaced upwardly from the lower level, said closure member and bearing member being movable by the shuttle member on movement of the shuttle member between its end positions which results from variations of pressure in the chamber resulting from the movement of the valve between the open and closed positions, wherein when the shuttle member is in its innermost position, the bearing member is at a position corresponding to the upper level of liquid in the reservoir and when the shuttle member is in its outermost position, the bearing member is in a position corresponding to a liquid level intermediate of the upper and lower level of liquid in the reservoir.

2. A valve as claimed at claim 1 wherein, the valve member is biased towards the closed position.

3. A valve as claimed at claim 2 wherein, the valve member is slidingly and sealingly received in said body.

4. A valve as claimed at claim 2 wherein the valve member is at least partially supported from the body by a diaphragm to isolate the inlet from the chamber and the valve is movable within the body with the flexing of the diaphragm.

5. A valve as claimed at claim 1 or 2 wherein the first passageway is provided through the valve member.

6. A valve as claimed at claim 5 wherein, the valve member is slidingly and sealingly received in said body.

7. A valve as claimed at claim 6 wherein the space defined between the opposed faces of the valve member and the body which are in a sliding relationship with each other is sealingly isolated from the inlet and the chamber.

8. A valve as claimed at claim 7 wherein the end of the space remote from the inlet is sealingly closed by a seal supported on the valve member which is in slidable sealing engagement with the body and the other end of the space is closed by a flexible diaphragm mounted between the body and the valve member intermediate of the first and second face, said diaphragm enabling movement of the valve member between the open and closed position.

9. A valve as claimed at claim 5 wherein the valve member is at least partially supported from the body by a diaphragm to isolate the inlet from the chamber and the valve is movable within the body with the flexing of the diaphragm.

10. A valve as claimed in claim 1 wherein the shuttle member is biased to its inner most position.

11. A valve as claimed at claim 10 wherein, the valve member is slidingly and sealingly received in said body.

12. A valve as claimed at claim 11 wherein the space defined between the opposed faces of the valve member and the body which are in a sliding relationship with each other is sealingly isolated from the inlet and the chamber.

13. A valve as claimed at claim 12 wherein the end of the space remote from the inlet is sealingly closed by a seal supported on the valve member which is in slidable sealing engagement with the body and the other end of the space is closed by a flexible diaphragm mounted between the body and the valve member intermediate of the first and second face, said diaphragm enabling movement of the valve member between the open and closed position.

14. A valve as claimed at claim 10 wherein the valve member is at least partially supported from the body by a diaphragm to isolate the inlet from the chamber and the valve is movable within the body with the flexing of the diaphragm.

15. A valve as claimed in claim 1 wherein the shuttle member comprises a member slidably and sealingly supported by the body.

16. A valve as claimed at claim 1 wherein the discharge outlet comprises a passageway through the shuttle member.

17. A valve as claimed at claim 16 wherein the shuttle member is biased to its inner most position.

18. A valve as claimed at claim 1 wherein the shuttle member comprises a second diaphragm supported from the body.

19. A valve as claimed at claim 18 wherein the discharge outlet comprises an opening through the second diaphragm.

20. A valve as claimed at claim 19 wherein the shuttle member is biased to its inner most position.

21. A valve as claimed at claim 18 wherein the shuttle member is biased to its inner most position.

22. A valve as claimed at claim 21 wherein, the valve member is slidingly and sealingly received in said body.

23. A valve as claimed at claim 22 wherein the space defined between the opposed faces of the valve member and the body which are in a sliding relationship with each other is sealingly isolated from the inlet and the chamber.

24. A valve as claimed at claim 23 wherein the end of the space remote from the inlet is sealingly closed by a seal supported on the valve member which is in slidable sealing engagement with the body and the other end of the space is closed by a flexible diaphragm mounted between the body and the valve member intermediate of the first and second face, said diaphragm enabling movement of the valve member between the open and closed position.

25. A valve as claimed at claim 21 wherein the valve member is at least partially supported from the body by a diaphragm to isolate the inlet from the chamber and the valve is movable within the body with the flexing of the diaphragm.

26. A valve as claimed claim 1 wherein, the bearing member comprises an arm pivotally supported from the body and having a first end spaced to one side of the pivot which is associated with the control means and a second end to the other side of the pivot which is adapted to be mounted to a float to be supported on said liquid.

27. A valve as claimed in claim 1 wherein, the valve member is slidingly and sealingly received in said body.

28. A valve as claimed at claim 27 wherein the space defined between the opposed faces of the valve member and the body which are in a sliding relationship with each other is sealingly isolated from the inlet and the chamber.

29. A valve as claimed at claim 28 wherein the end of the space remote from the inlet is sealingly closed by a seal supported on the valve member which is in slidable sealing engagement with the body and the other end of the space is closed by a flexible diaphragm mounted between the body and the valve member intermediate of the first and second face, said diaphragm enabling movement of the valve member between the open and closed position.

30. A valve as claimed at claim 1 wherein the valve member is at least partially supported from the body by a diaphragm to isolate the inlet from the chamber and the valve is movable within the body with the flexing of the diaphragm.

31. A valve adapted to fill a reservoir with liquid to a predetermined liquid level, said valve comprising:

a body having an inlet adapted to be connected to a source of liquid and an outlet;

a valve member movable between an open and closed position, said valve member being adapted to selectively allow liquid to flow from the source to the reservoir when said valve member is in the open position, and to block said liquid flow when said valve is in the closed position;

a bearing member having a variable position with respect to said housing, said variable position being dependent on the liquid level in the reservoir;

a closure member disposed in said body and cooperating with said bearing member to control said valve member, wherein said closure member cooperates with said bearing member to close said valve member when the liquid reaches said predetermined level within said reservoir and wherein said bearing member is moved to a bearing intermediate position corresponding to a liquid level below said predetermined level without opening said valve member after said valve member has been closed;

wherein said valve remains closed while the liquid level drops from said threshold level to the level corresponding to said intermediate bearing level; and wherein said valve remains open while the liquid level rises from a position below the level corresponding to the intermediate bearing level to the predetermined level.

32. The valve of claim 31 further comprising a shuttle member disposed in said body and having a first and a second position, said shuttle member being constructed arranged to shift from said first to said second position after said valve has closed to cause said bearing member to move to said intermediate bearing position.

33. The valve of claim 32 wherein said valve member defines a chamber within said body, and wherein said shuttle member is constructed and ( arranged to move in one of said first and second positions on accordance with the pressure within said chamber.

* * * * *